US012066326B2

(12) United States Patent
Yokino et al.

(10) Patent No.: US 12,066,326 B2
(45) Date of Patent: Aug. 20, 2024

(54) SPECTROMETER

(71) Applicant: HAMAMATSU PHOTONICS K.K., Hamamatsu (JP)

(72) Inventors: Takafumi Yokino, Hamamatsu (JP); Toshiteru Suzuki, Hamamatsu (JP); Katsuhiko Kato, Hamamatsu (JP); Issei Oshima, Hamamatsu (JP); Takashi Oba, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 85 days.

(21) Appl. No.: 17/426,133

(22) PCT Filed: Jan. 28, 2020

(86) PCT No.: PCT/JP2020/003016
§ 371 (c)(1),
(2) Date: Jul. 28, 2021

(87) PCT Pub. No.: WO2020/158745
PCT Pub. Date: Aug. 6, 2020

(65) Prior Publication Data
US 2022/0099487 A1    Mar. 31, 2022

(30) Foreign Application Priority Data

Jan. 30, 2019 (JP) ................ 2019-014161

(51) Int. Cl.
*G01J 3/02* (2006.01)
(52) U.S. Cl.
CPC ............ *G01J 3/0256* (2013.01); *G01J 3/021* (2013.01); *G01J 3/0262* (2013.01)

(58) Field of Classification Search
CPC ..................................... G01J 3/0286
See application file for complete search history.

(56) References Cited

U.S. PATENT DOCUMENTS

| 11,035,727 B2 * | 6/2021 | Bezel ...................... G01J 3/443 |
| 2002/0033525 A1 | 3/2002 | Ohuchi |

FOREIGN PATENT DOCUMENTS

| CN | 101970995 A | 2/2011 |
| CN | 104541138 A | 4/2015 |

(Continued)

OTHER PUBLICATIONS

International Preliminary Report on Patentability mailed Aug. 12, 2021 for PCT/JP2020/003016.

*Primary Examiner* — Dominic J Bologna
*Assistant Examiner* — Mohamed Doumbia
(74) *Attorney, Agent, or Firm* — Faegre Drinker Biddle & Reath LLP

(57) ABSTRACT

A spectrometer includes a support having a bottom wall part and a side wall part surrounding a spectroscopic space, a cover arranged on an opening part formed by the side wall part and provided with a light transmitting part, a joining member arranged between the cover and the opening part, a light detection element supported by the side wall part between the spectroscopic space and the cover, and an optical function part provided on a surface of the bottom wall part. A vent is provided in at least one of the support, the cover, and the joining member. The vent is open to an outside and a space defined by the support, the cover, and the light detection element. The space communicates with the spectroscopic space.

10 Claims, 5 Drawing Sheets

(56) References Cited

FOREIGN PATENT DOCUMENTS

| | | | |
|---|---|---|---|
| CN | 105960578 A | 9/2016 | |
| CN | 107923795 A | 4/2018 | |
| JP | 2002-118209 A | 4/2002 | |
| JP | 2004-354176 A | 12/2004 | |
| JP | 2010-256670 A | 11/2010 | |
| JP | 2014-032155 A | 2/2014 | |
| JP | 2018043562 A * | 9/2016 | |
| JP | 2017138320 A1 * | 3/2017 | |
| JP | 2017-138320 A | 8/2017 | |
| JP | 2017138320 A * | 8/2017 | ............ G01J 3/0205 |
| JP | 2018-043562 A | 3/2018 | |
| JP | 2018043562 A * | 3/2018 | |
| JP | 2018-109652 A | 7/2018 | |
| JP | 6353999 B1 | 7/2018 | |
| WO | WO 2008/038453 A1 | 4/2008 | |
| WO | WO-2009/139327 A1 | 11/2009 | |
| WO | WO 2014/024759 A1 | 2/2014 | |

* cited by examiner (a)

(b)

SPECTROMETER

TECHNICAL FIELD

The present disclosure relates to a spectrometer.

BACKGROUND ART

There has been a known spectrometer including a support, a dispersive part provided on a surface of a bottom wall part of the support, and a light detection element supported by a side wall part of the support to face the dispersive part (for example, see Patent Literature 1).

CITATION LIST

Patent Literature

Patent Literature 1: Japanese Unexamined Patent Publication No. 2004-354176

SUMMARY OF INVENTION

Technical Problem

In the spectrometer described above, in order to suppress entry of water into a spectroscopic space, it is conceivable to adopt a configuration in which the spectroscopic space is airtightly sealed. However, when the spectroscopic space is airtightly sealed, an internal pressure changes due to a temperature change in a usage environment of the spectrometer, and thus a dispersive part is provided, a support supporting the light detection element is deformed, and spectroscopic accuracy may decrease. In particular, as the spectrometer becomes smaller, an influence of deformation of the support on the spectroscopic accuracy increases.

Therefore, an object of the disclosure is to provide a highly reliable spectrometer.

Solution to Problem

A spectrometer of an aspect of the disclosure includes a support having a bottom wall part and a side wall part surrounding a spectroscopic space on one side of the bottom wall part, a cover arranged on an opening part formed by the side wall part and provided with a light transmitting part, a joining member arranged between the cover and the opening part, a light detection element supported by the side wall part between the spectroscopic space and the cover to face a surface of the bottom wall part on the one side, and an optical function part provided on the surface of the bottom wall part on the one side, in which a vent is provided in at least one of the support, the cover, and the joining member, the vent is open to an outside and a space defined by the support, the cover, and the light detection element, and the space defined by the support, the cover, and the light detection element communicates with the spectroscopic space.

In this spectrometer, the spectroscopic space and the outside are communicated with each other by the vent provided in at least one of the support, the cover, the joining member. Therefore, even when a temperature of a usage environment of the spectrometer changes, deformation of the support due to a change in internal pressure is suppressed. Therefore, a positional relationship of the optical function part, the light detection element, etc. is less likely to vary. Further, the vent is open to the outside and the space defined by the support, the cover, and the light detection element, and the space is communicated with the spectroscopic space. In this way, even when stray light is incident on the vent from the outside, the stray light rarely enters the spectroscopic space. Therefore, according to the spectrometer, high reliability can be ensured.

In the spectrometer of the aspect of the disclosure, a direction in which the vent opens may intersect with a direction in which light is incident on the spectroscopic space through the cover. In this way, even when stray light is incident on the vent from the outside, it is possible to more reliably inhibit the stray light from entering the spectroscopic space.

In the spectrometer of the aspect of the disclosure, the cover may have a light transmitting member and a light shielding layer in which a light transmitting opening is formed. In this way, light can be incident on the spectroscopic space in an appropriate state while suppressing entry of particles into the spectroscopic space.

In the spectrometer of the aspect of the disclosure, the support may be provided with a first widened part wider than the spectroscopic space on the one side of the spectroscopic space and a second widened part wider than the first widened part on the one side of the first widened part, the light detection element may be arranged in the first widened part, and the cover may be arranged in the second widened part which is the opening part. In this way, while stably supporting the light detection element and the cover, the space in which the vent opens can be reliably defined by the support, the cover, and the light detection element.

In the spectrometer of the aspect of the disclosure, each of the first widened part and the second widened part may have a shape in which a direction intersecting with a direction in which light is incident on the spectroscopic space through the cover is set as a longitudinal direction, and the vent may be provided in the joining member to be located at an end part of the second widened part in the longitudinal direction. In this way, since a position of the vent becomes a position away from the optical path in the spectroscopic space, even when stray light is incident on the vent from the outside, it is possible to more reliably inhibit the stray light from entering the spectroscopic space.

In the spectrometer of the aspect of the disclosure, each of the first widened part and the second widened part may have a shape in which a direction intersecting with a direction in which light is incident on the spectroscopic space through the cover is set as a longitudinal direction, and the vent may be provided in the support to open to an end part of the first widened part in the longitudinal direction. In this way, since a position of the vent becomes a position away from the optical path in the spectroscopic space, even when stray light is incident on the vent from the outside, it is possible to more reliably inhibit the stray light from entering the spectroscopic space.

In the spectrometer of the aspect of the disclosure, an end part of a wiring may be arranged in the first widened part, a terminal of the light detection element and the end part of the wiring may be electrically connected by a connecting member, and a reinforcing member may be arranged between the light detection element and the first widened part to cover the connecting member. In this way, since the reinforcing member functions as a light shielding member, even when stray light is incident on the vent from the outside, it is possible to more reliably inhibit the stray light from entering the spectroscopic space.

In the spectrometer of the aspect of the disclosure, the optical function part may be a dispersive part. In this way, the dispersive part can reliably exhibit a desired optical function.

The optical function part may be a mirror. In this way, the mirror can reliably exhibit a desired optical function.

The spectrometer of the aspect of the disclosure may further include a light shielding member arranged between the vent and the spectroscopic space. In this way, even when stray light is incident on the vent from the outside, it is possible to more reliably inhibit the stray light from entering the spectroscopic space.

Advantageous Effects of Invention

According to the disclosure, it is possible to provide a highly reliable spectrometer.

DESCRIPTION OF EMBODIMENTS

Figure 1:
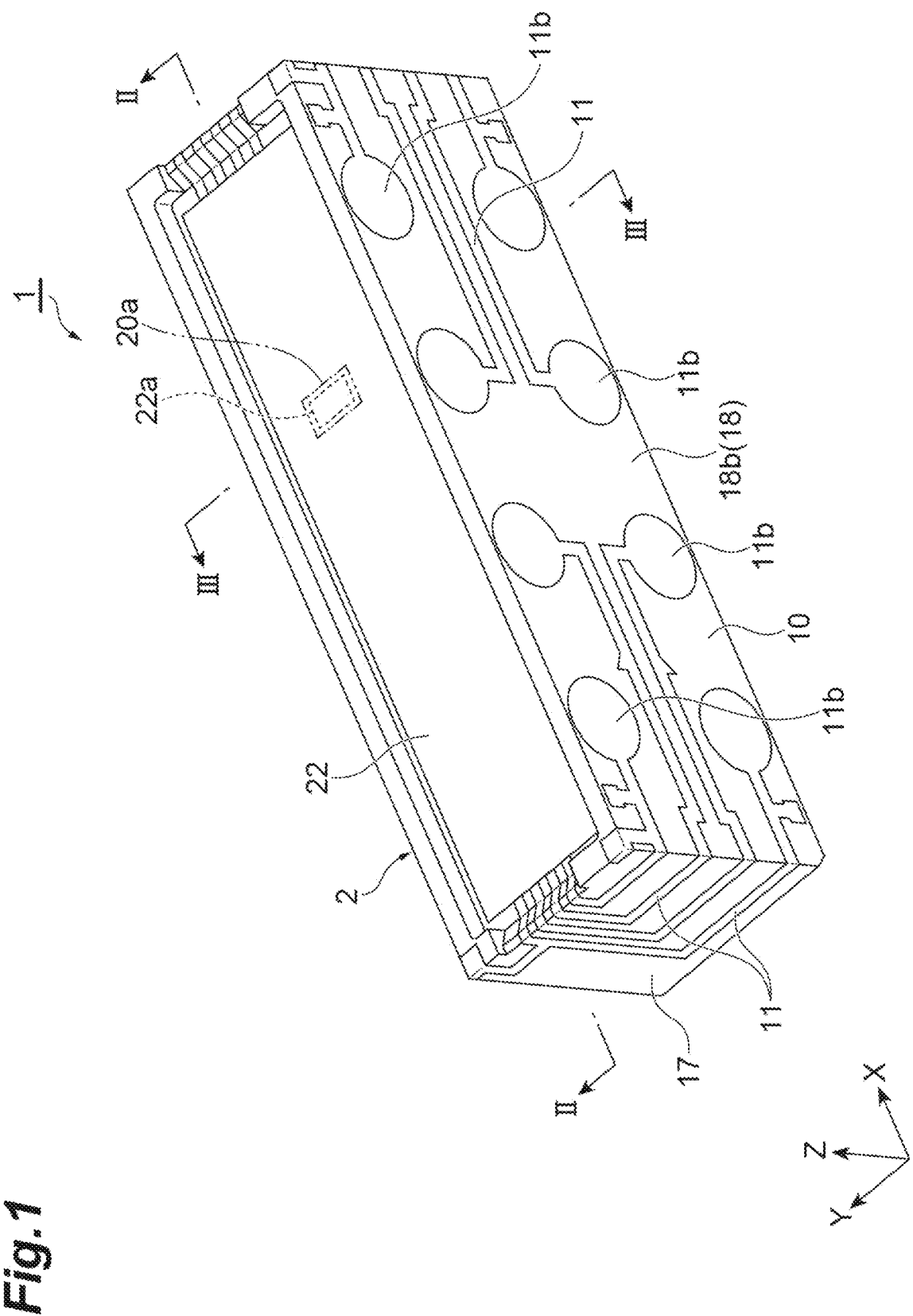
FIG. 1 is a perspective view of a spectrometer of an embodiment.

In the following, an embodiment of the disclosure will be described in detail with reference to the drawings. Note that in the drawings, the same or equivalent parts will be referred to with the same signs while omitting their overlapping descriptions.

[Configuration of Spectrometer]

As illustrated in FIG. 1, a spectrometer 1 includes a support 10 and a cover 20. In the spectrometer 1, a box-shaped package 2 includes the support 10 and the cover 20. The support 10 is configured as a molded circuit component (MID: molded interconnect device), and the support 10 is provided with a plurality of wirings 11. As an example, the spectrometer 1 has a rectangular parallelepiped shape having a length of 15 mm or less in each of an X-axis direction, a Y-axis direction, and a Z-axis direction. In particular, the spectrometer 1 is thinned to a length of about several mm in the Y-axis direction.

Figure 2:
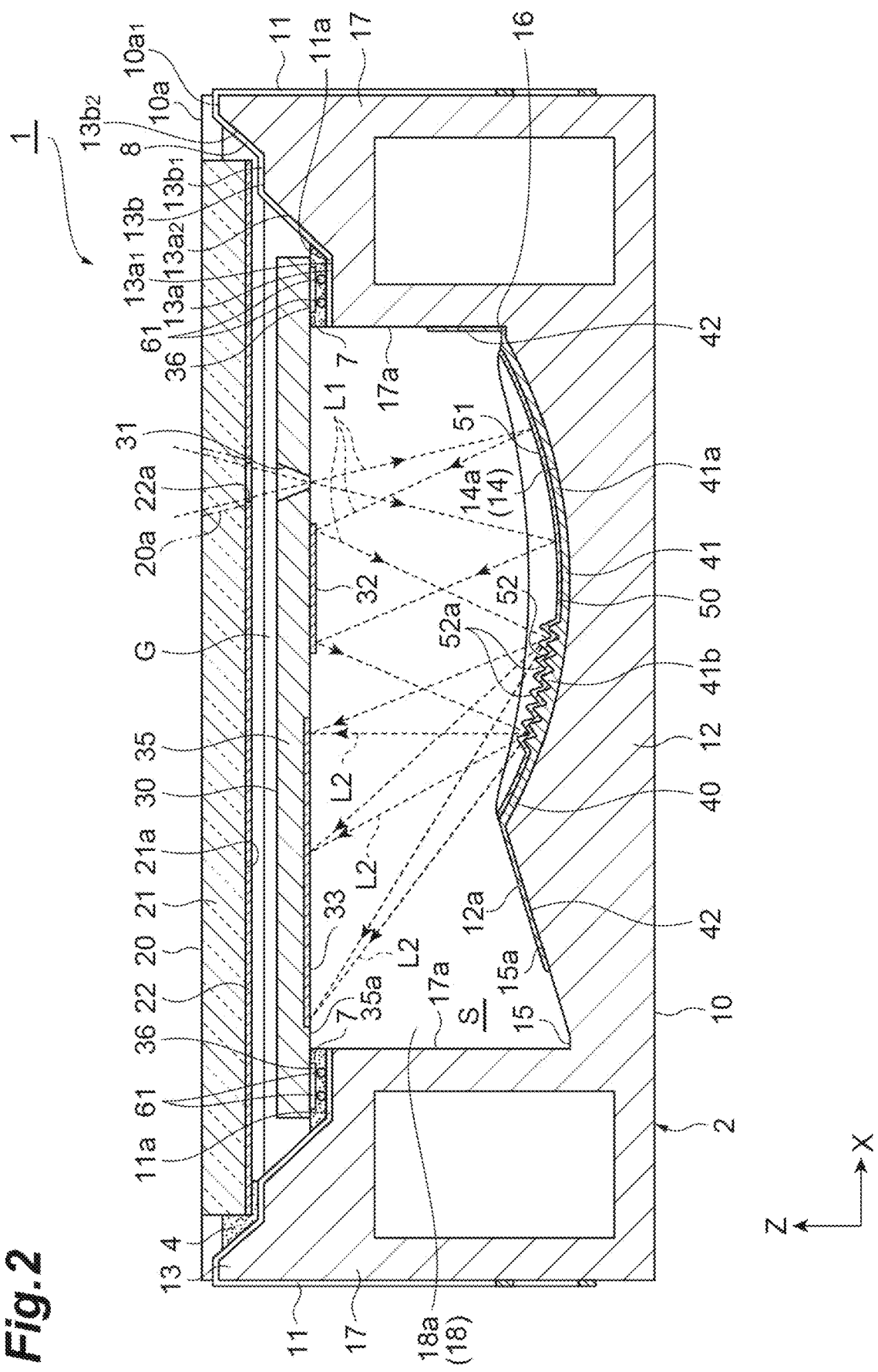
FIG. 2 is a cross-sectional view of the spectrometer along line II-II illustrated in FIG. 1.
Figure 3:
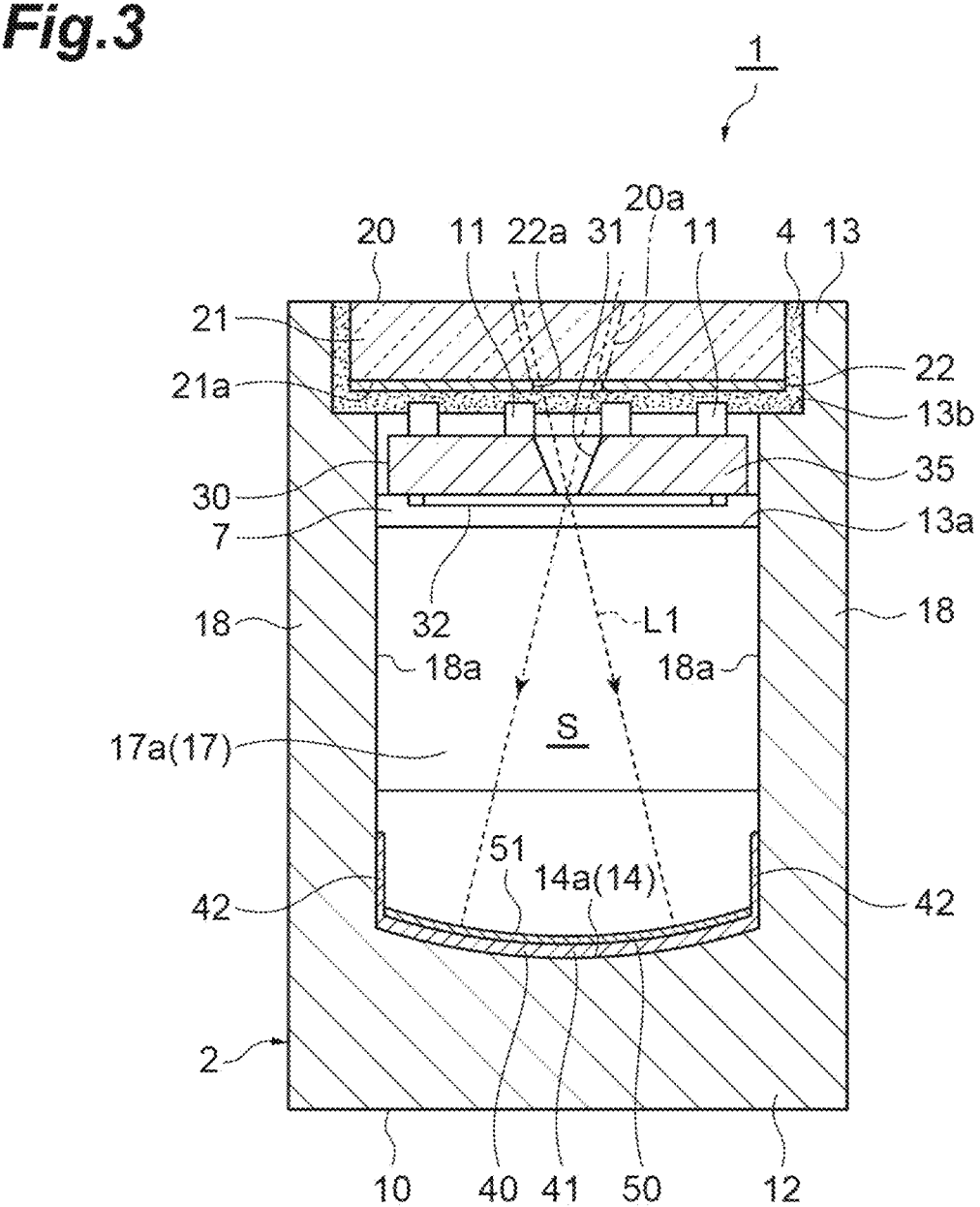
FIG. 3 is a cross-sectional view of the spectrometer along line III-III illustrated in FIG. 1.

As illustrated in FIG. 2 and FIG. 3, a light detection element 30, a resin molded layer 40, and a reflecting layer 50 are provided in the package 2. The reflecting layer 50 is included in a mirror 51 and a dispersive part 52 as an optical function part. The light detection element 30 is provided with a light passing part 31, a mirror 32, and a light detection part 33. The light passing part 31, the mirror 51, the mirror 32, the dispersive part 52, and the light detection part 33 are arranged on the same straight line parallel to the X-axis direction when viewed in the Z-axis direction.

In the spectrometer 1, light L1 passing through the light passing part 31 along the Z-axis direction is reflected by the mirror 51, and the light L1 reflected by the mirror 51 is reflected by the mirror 32. The light L1 reflected by the mirror 32 is dispersed and reflected by the dispersive part 52. In light dispersed and reflected by the dispersive part 52, light L2 other than zero-order light enters the light detection part 33 and is detected by the light detection part 33. As described above, in the spectrometer 1, a spectroscopic space S including an optical path of the light L1 from the light passing part 31 to the dispersive part 52 and an optical path of the light L2 from the dispersive part 52 to the light detection part 33 is formed in the package 2.

The support 10 has a bottom wall part 12 and a side wall part 13. The bottom wall part 12 and the side wall part 13 are integrally formed of, for example, a synthetic resin such as liquid crystal polymer (LCP). A depression 14 and peripheral parts 15 and 16 are provided on a surface 12a of the bottom wall part 12 on the spectroscopic space S side (on one side). The side wall part 13 is arranged on the spectroscopic space S side of the bottom wall part 12. The side wall part 13 surrounds the spectroscopic space S on the spectroscopic space S side of the bottom wall part 12. In the present embodiment, the side wall part 13 has a rectangular frame-like shape that surrounds the depression 14 and the peripheral parts 15 and 16 when viewed in the Z-axis direction. More specifically, the side wall part 13 has a pair of first side walls 17 and a pair of second side walls 18. The pair of first side walls 17 faces each other with the spectroscopic space S interposed therebetween in the X-axis direction when viewed in the Z-axis direction. The pair of second side walls 18 faces each other with the spectroscopic space S interposed therebetween in the Y-axis direction when viewed in the Z-axis direction.

A first widened part 13a and a second widened part 13b are provided in the side wall part 13. The first widened part 13a is a stepped part widened in the X-axis direction with respect to the spectroscopic space S on the opposite side from the bottom wall part 12 with respect to the spectroscopic space S (on one side of the spectroscopic space S). The second widened part 13b is a stepped part widened in each of the X-axis direction and the Y-axis direction with respect to the first widened part 13a on the opposite side from the bottom wall part 12 with respect to the first widened part 13a (on one side of the first widened part 13a). The second widened part 13b is an opening part formed by the side wall part 13. One end part of each wiring 11 is arranged as a terminal 11a on a bottom surface of the first widened part 13a. As illustrated in FIG. 1, each wiring 11 reaches an outer surface 18b of one of the second side walls 18 from the first widened part 13a via the second widened part 13b and an outer surface of the first side wall 17. The other end part of each wiring 11 is arranged on the outer surface 18b as a terminal 11b.

As illustrated in FIG. 2, side surfaces $13a_2$ of first widened parts 13a facing each other in the X-axis direction are inclined to form obtuse angles with bottom surfaces $13a_1$ of the first widened parts 13a. Side surfaces $13b_2$ of second widened parts 13b facing each other in the X-axis direction are inclined to form obtuse angles with bottom surfaces $13b_1$ of the second widened parts 13b. As a result, the wirings 11 can be easily and accurately drawn, and the stress generated in the wirings 11 can be reduced. Further, a region $10a_1$ in which the wirings 11 are arranged on an end surface 10a of the support 10 on the opposite side from the bottom wall part 12 is recessed to the bottom wall part 12 side. As a result, for example, it is possible to prevent the wirings 11 from coining into contact with other members when the spectrometer 1 is mounted, and it is possible to reduce a length of the wirings 11.

As illustrated in FIG. 2 and FIG. 3, an inner surface of the depression 14 is a concave curved surface 14a. That is, the surface 12a of the bottom wall part 12 includes the concave curved surface 14a. In the present embodiment, the concave curved surface 14a is curved in a curved surface shape in each of the X-axis direction and the Y-axis direction. For example, the concave curved surface 14a has a shape corresponding to a part of a spherical surface. Each of the peripheral parts 15 and 16 is adjacent to the depression 14 in the X-axis direction. The peripheral part 15 is located on a side of one of the first side walls 17 with respect to the depression 14 when viewed in the Z-axis direction. The peripheral part 16 is located on a side of the other first side wall 17 with respect to the depression 14 when viewed in the Z-axis direction. The peripheral part 15 includes an inclined surface 15a. The inclined surface 15a is inclined to be away from the light detection element 30 along the Z-axis direction as the inclined surface 15a is away from the depression 14 along the X-axis direction.

The light detection element 30 is arranged in the first widened part 13a of the side wall part 13. The light detection element 30 is supported by the side wall part 13 so as to face the surface 12a of the bottom wall part 12 via the spectroscopic space S. The light detection element 30 has a substrate 35. The substrate 35 is formed in a rectangular plate shape by a semiconductor material (for example, silicon, etc.). The light passing part 31 is a light passing hole formed in the substrate 35. In the present embodiment, the light passing part 31 is a slit extending in the Y-axis direction, and an end part of the light passing part 31 on an entrance side of the light L1 widens toward the entrance side of the light L1 in each of the X-axis direction and the Y-axis direction. The mirror 32 is provided in a region between the light passing part 31 and the light detection part 33 on a surface 35a of the substrate 35 on the spectroscopic space S side. For example, the mirror 32 is a metal film made of Al, Au, etc. In the present embodiment, the mirror 32 is a flat mirror.

The light detection part 33 is provided on the surface 35a of the substrate 35. More specifically, the light detection part 33 is put in the substrate 35 made of the semiconductor material rather than being attached to the substrate 35. That is, the light detection part 33 includes a plurality of photodiodes formed in a first conductivity type region inside the substrate 35 made of the semiconductor material and a second conductivity type region provided within the region. For example, the light detection part 33 is configured as a photodiode array, a C-MOS image sensor, a CCD image sensor, etc., and has a plurality of light detection channels arranged along the X-axis direction. Lights L2 having different wavelengths are let into the respective light detection channels of the light detection part 33. The light detection part 33 is configured as a surface-incident photodiode, and a plurality of terminals 36 for inputting/outputting electric signals to/from the light detection part 33 is provided on the surface 35a of the substrate 35.

The terminal 36 of the light detection element 30 and the terminal 11a of the wiring 11 facing each other in the first widened part 13a are electrically and physically connected by, for example, a plurality of bumps (connecting members) 61 made of Au, solder, etc. A reinforcing member (light shielding member) 7 made of resin is arranged between the light detection element 30 and the first widened part 13a so as to cover the plurality of bumps 61.

The cover 20 is arranged in the second widened part 13b of the side wall part 13. The cover 20 is separated from the light detection element 30. A joining member 4 made of resin is arranged between the cover 20 and the second widened part 13b. The cover 20 has a light transmitting member 21 and a light shielding layer 22. The light transmitting member 21 is formed in a rectangular plate shape using a material which transmits the light L1 therethrough (for example, silica, borosilicate glass (BK7), Pyrex (registered trademark) glass, Kovar glass, etc.). The light shielding layer 22 is provided on a surface 21a of the light transmitting member 21 on the spectroscopic space S side. A light transmitting opening 22a is formed in the light shielding layer 22 to oppose the light passing part 31 of the light detection element 30 in the Z-axis direction. In the present embodiment, the light transmitting opening 22a is a slit extending in the Y-axis direction. The cover 20 transmits the light L1 along the Z-axis direction through the light transmitting member 21 and the light transmitting opening 22a of the light shielding layer 22. In this way, in the cover 20, a part of the light transmitting member 21 overlapping with the light transmitting opening 22a when viewed in the Z-axis direction functions as a light transmitting part 20a.

Note that when the light L1 is light in an infrared region, silicon, germanium, etc. are effective as a material of the light transmitting member 21. Further, the light transmitting member 21 may be provided with an anti reflection (AR) coat or may have a filter function for transmitting only light having a predetermined wavelength. Further, as the material of the light shielding layer 22, for example, black resist, Al, etc. can be used.

The resin molded layer 40 is provided on the surface 12a of the bottom wall part 12. The resin molded layer 40 is formed by curing a resin material, which is a molding material, in a predetermined shape (for example, photocuring by ultraviolet rays, etc., thermal curing, etc.). The resin material that is the molding material is, for example, an optical resin for replicas such as a photocurable epoxy resin, an acrylic resin, a fluororesin, a silicone, an organic/inorganic hybrid resin, etc.

The resin molded layer 40 has a first part 41 and a second part 42. The first part 41 is a part having a shape corresponding to the mirror 51 and the dispersive part 52, and is provided on the concave curved surface 14a on the surface 12a of the bottom wall part 12. More specifically, the first part 41 includes a part 41a having a shape corresponding to the mirror 51 and a part 41b having a shape corresponding to the dispersive part 52. In the present embodiment, the shape corresponding to the mirror 51 is a concave mirror pattern, and the shape corresponding to the dispersive part 52 is a grating pattern. The second part 42 is a part that surrounds the first part 41 and is thinner than the first part 41. In the present embodiment, the second part 42 reaches the inclined surface 15a on the surface 12a of the bottom wall part 12, an inner surface 17a of the first side wall 17 on the peripheral part 16 side, and an inner surface 18a of each second side wall 18, and does not reach an inner surface 17a of the first side wall 17 on the peripheral part 15 side. In this way, at least a portion of the second part 42 reaches a surface of the side wall part 13 on the spectroscopic space S side beyond a boundary region between the surface 12a of the bottom wall part 12 and the surface of the side wall part 13 on the spectroscopic space S side.

Note that the first part 41 may be provided on the entire surface 12a of the bottom wall part 12, and the second part 42 may not be provided on the surface 12a of the bottom wall part 12. Further, at least a portion of the first part 41 may reach the surface of the side wall part 13 on the spectroscopic space S side. That is, it is sufficient that the first part 41 may be provided at least on a portion of the surface 12a of the bottom wall part 12, and the second part 42 may be provided at least on the portion of the surface 12a of the bottom wall part 12 and the surface of the side wall part 13 on the spectroscopic space S side as long as the second part 42 is a part that surrounds the first part 41 and is thinner than the first part 41.

The first part 41 provided at least on the portion of the surface 12a of the bottom wall part 12 is a part that widens along a surface shape of the at least the portion. The second part 42 provided at least on a portion on the surface 12a of the bottom wall part 12 and the surface of the side wall part 13 on the spectroscopic space S side is, for example, a part that widens with a substantially uniform thickness along a surface shape of the at least the portion. In the present embodiment, a thickness of the first part 41 is 21 µm to 210 µm, and a thickness of the second part 42 is 1 µm to 10 µm. A numerical value of the thickness of each of the first part 41 and the second part 42 is a numerical value when a surface in a state where unevenness of the surface of the support 10 is filled is set to 0. Note that when the thickness of the first part 41 (distance from the inner surface of the support 10 in each portion of the first part 41) changes, an average value thereof can be regarded as the thickness of the first part 41. Further, when the thickness of the second part 42 (distance from the inner surface of the support 10 in each portion of the second part 42) changes, an average value thereof can be regarded as the thickness of the second part 42.

The reflecting layer 50 is provided on the resin molded layer 40. The reflecting layer 50 is, for example, a metal film made of Al, Au, etc. The reflecting layer 50 forms the mirror 51 and the dispersive part 52 on the bottom wall part 12 by covering at least the first part 41 (more specifically, at least the parts 41a and 41b) of the resin molded layer 40. In the present embodiment, the mirror 51 is a concave mirror, and the dispersive part 52 is a reflection grating having a plurality of grating grooves 52a arranged along the X-axis direction. As described above, the mirror 51 and the dispersive part 52 are provided on the surface 12a of the bottom wall part 12 via the resin molded layer 40.

As described above, when the resin molded layer 40 is formed, an influence of a surface state of the bottom wall part 12 is unlikely to appear, the amount of deformation due to a temperature change in a usage environment of the spectrometer 1 is unlikely to increase, and the resin molded layer 40 can be inhibited from being peeling off from the support 10 by the second part 42 thinner than the first part 41 while ensuring a necessary and sufficient thickness in the first part 41. Therefore, in the reflecting layer 50, the mirror 51 and the dispersive part 52 can appropriately exert a desired optical function.

As illustrated in FIG. 2, in the spectrometer 1, the light detection element 30 is supported by the side wall part 13 between the spectroscopic space S and the cover 20. However, a space G communicates with the spectroscopic space S. The space G is a space defined by the support 10, the cover 20, and the light detection element 30. In the present embodiment, the space G communicates with the spectroscopic space S by at least the light passing part 31.

A vent 8 opening to the space G and the outside is provided in the joining member 4. More specifically, in the second widened part 13b having a shape in which a direction (X-axis direction) intersecting with a direction (Z-axis direction) in which light is incident on the spectroscopic space S through the cover 20 is set as a longitudinal direction, the vent 8 is provided in the joining member 4 so as to be located at one end part of the second widened part 13b in the longitudinal direction. A direction in which the vent 8 opens intersects with a direction in which the light L1 is incident on the spectroscopic space S through the cover 20. The direction in which the vent 8 opens refers to a direction passing through a center of an opening of the vent 8 on the space G side and a center of an opening of the vent 8 on the outer side. Note that the spectroscopic space S may not be visually observed from the opening of the vent 8 on the outer side.

[Action and Effect]

In the spectrometer 1, the spectroscopic space S and the outside are communicated with each other by the vent 8 provided in the joining member 4. Therefore, even when the support 10 is heated during mounting of the spectrometer 1, or a temperature of a usage environment of the spectrometer 1 changes, deformation of the support 10 due to a change in internal pressure is suppressed. Therefore, a positional relationship of the mirror 51, the dispersive part 52, the light detection element 30, etc. is less likely to vary. Further, the vent 8 is open to the space G and the outside, and the space G is communicated with the spectroscopic space S. In this way, even when stray light is incident on the vent 8 from the outside, the stray light rarely enters the spectroscopic space S. Therefore, the mirror 51 and the dispersive part 52 can appropriately exhibit desired optical functions. Therefore, according to the spectrometer 1, high reliability can be ensured.

Note that, for example, it is not preferable to form the cover 20 using a material having a light shielding property, and to provide the cover 20 with a slit, which is a space, in place of the light transmitting part 20a. In this case, particles easily enter the spectroscopic space S through the slit, which is a space, which leads to deterioration of the spectrometer 1. In the spectrometer 1 of the present embodiment, as a configuration allowing light L0 to enter the spectroscopic space S, the light transmitting part 20a not allowing air to pass through is provided on the cover 20, and the vent 8 is provided at a position different from a position at which the light L0 is allowed to enter the spectroscopic space S. Thus, particles rarely enter the spectroscopic space S. In particular, in the spectrometer 1 of the present embodiment, when viewed in the Z-axis direction, since at least a part of the light transmitting part 20a of the cover 20 and at least a part of the light passing part 31 of the light detection element 30 overlap each other, it is extremely important to provide the light transmitting part 20a not allowing air to pass through in the cover 20, and provide the vent 8 at the position different from the position at which the light L0 is allowed to enter the spectroscopic space S.

Further, in the spectrometer 1, the direction in which the vent 8 opens intersects with the direction in which light is incident on the spectroscopic space S through the cover 20. In this way, even when the stray light is incident on the vent 8 from the outside, it is possible to more reliably inhibit the stray light from entering the spectroscopic space S.

Further, in the spectrometer 1, the cover 20 has the light transmitting member 21 and the light shielding layer 22 in which the light transmitting opening 22a is formed. In this way, the light L1 can be incident on the spectroscopic space S in an appropriate state while suppressing entry of particles into the spectroscopic space S.

Further, in the spectrometer 1, the light detection element 30 is arranged in the first widened part 13a of the support 10, and the cover 20 is arranged in the second widened part 13b of the support 10. In this way, while stably supporting the light detection element 30 and the cover 20, the space G in which the vent 8 opens can be reliably defined by the support 10, the cover 20, and the light detection element 30.

Further, in the spectrometer 1, a side surface $13b_2$ of the second widened part 13b is inclined to form an obtuse angle with the bottom surface $13b_1$ of the second widened part 13b, and a distance between the side surface 13b₂ of the second widened part 13b and a side surface of the cover 20 becomes narrower toward the bottom surface 13b₁ of the second widened part 13b. In this way, since the stray light incident on the vent 8 from the outside is attenuated, it is possible to more reliably inhibit the stray light from entering the spectroscopic space S.

Further, in the spectrometer 1, the vent 8 is provided in the joining member 4 so as to be located at an end part of the second widened part 13b in the longitudinal direction. In this way, since a position of the vent 8 becomes a position away from the optical path in the spectroscopic space S, even when stray light is incident on the vent 8 from the outside, it is possible to more reliably inhibit the stray light from entering the spectroscopic space S.

Further, in the spectrometer 1, a reinforcing member 7 is arranged between the light detection element 30 and the first widened part 13a to cover the bump 61. In this way, since the reinforcing member 7 functions as a light shielding member, even when stray light is incident on the vent 8 from the outside, it is possible to more reliably inhibit the stray light from entering the spectroscopic space S.

Further, in the spectrometer 1, the reinforcing member 7 is arranged between the vent 8 and the spectroscopic space S. In this way, since the reinforcing member 7 functions as a light shielding member, even when stray light is incident on the vent 8 from the outside, it is possible to more reliably inhibit the stray light from entering the spectroscopic space S.

MODIFIED EXAMPLE

The disclosure is not limited to the embodiment described above. For example, the spectrometer 1 may further include a wiring unit including a flexible wiring board having a plurality of wirings. In this case, one end part of each wiring in the wiring unit is electrically and physically connected to the terminal 11b of each wiring 11 arranged on the outer surface 18b of the support 10 (see FIG. 1), and the other end part of each wiring in the wiring unit is configured, for example, as a connector. Further, the support 10 is not limited to that formed of a synthetic resin, and may be formed of, for example, a ceramic such as AlN or Al₂O₃. Further, the support 10 is not limited to that having the side wall part 13 having a quadrangular tubular shape, and may have the side wall part 13 having a polygonal tubular shape other than the quadrangular tubular shape, or the side wall part 13 having a circular tubular shape, an elliptical tubular shape, etc. Further, the side wall part 13 may not be provided with the first widened part 13a and the second widened part 13b. Further, the support 10 may not be provided with the wirings 11. In this case, a flexible wiring substrate provided separately from the support 10 may be electrically connected to the light detection element 30, or the light detection element 30 may be configured to be electrically connected to an external wiring. Further, in the support 10, an inner surface of the depression 14 provided on the surface 12a of the bottom wall part 12 is not limited to the concave curved surface 14a, and may include, for example, a flat bottom surface.

Further, in the light detection element 30, for example, a zero-order light capture part (for example, a light passing hole, etc. formed in the substrate 35) may be provided to be located between the mirror 32 and the dispersive part 52. In this way, in light dispersed and reflected by the dispersive part 52, zero-order light can be incident on the zero-order light capture part and captured by the zero-order light capture part. Further, the light detection element 30 may be supported by the support 10, for example, by being attached to another member attached to the support 10. As an example, the light detection element 30 may be supported by the side wall part 13 by being attached to a support member bridged by the side wall part 13. In this case, at least one of the light passing part 31, the mirror 32, and the zero-order light capture part may be provided on the support member.

Further, the terminal 36 of the light detection element 30 and the terminal 11a of the wiring 11 facing each other in the first widened part 13a may be electrically and physically connected by a solder layer (connecting member). Further, the light detection part 33 may be configured as a backside incident type photodiode. In this case, since the plurality of terminals 36 is arranged on a surface of the substrate 35 on the opposite side from the surface 35a, the terminal 36 of the corresponding light detection element 30 and the terminal 11a of the wiring 11 may be electrically connected by a wire (connecting member). Further, for example, when a plurality of rays of the light L2 (a plurality of rays of the light L2 having different wavelengths) dispersed and reflected by the dispersive part 52 is sequentially incident on the light detection part 33 by configuring the dispersive part 52 so that the dispersive part 52 can move or swing, the light detection part 33 may be configured as a single element (having one light detection channel). In this case, the dispersive part 52 may be provided on the light detection element 30 side. As an example, the dispersive part 52 may be configured to be able to move or swing in the light detection element 30, configured to be able to move or swing in another member to which the light detection element 30 is attached, or configured to be able to move or swing in the cover 20.

Further, when the spectrometer 1 is configured such that the light L1 passing through the light passing part 31 is dispersed and reflected by the dispersive part, and the light L2 dispersed and reflected by the dispersive part is incident on the light detection part 33, the reflecting layer 50 may be included in the dispersive part as an optical function part. Further, when the spectrometer 1 is configured such that the light L1 passing through the light passing part 31 is reflected by a first mirror, the light L1 reflected by the first mirror is dispersed and reflected by the dispersive part, the light L2 dispersed and reflected by the dispersive part is reflected by a second mirror, and the light L2 reflected by the second mirror is incident on the light detection part 33, the reflecting layer 50 may be included in the first mirror and the second mirror as an optical function part.

Figure 4:
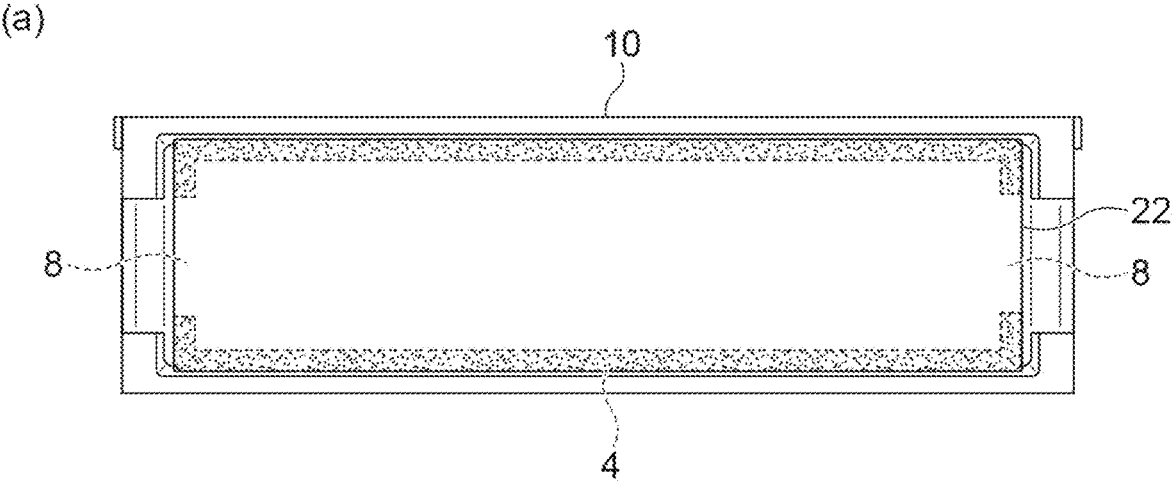
FIG. 4 is a plan view of a spectrometer including a vent of a modified example.
Figure 4:
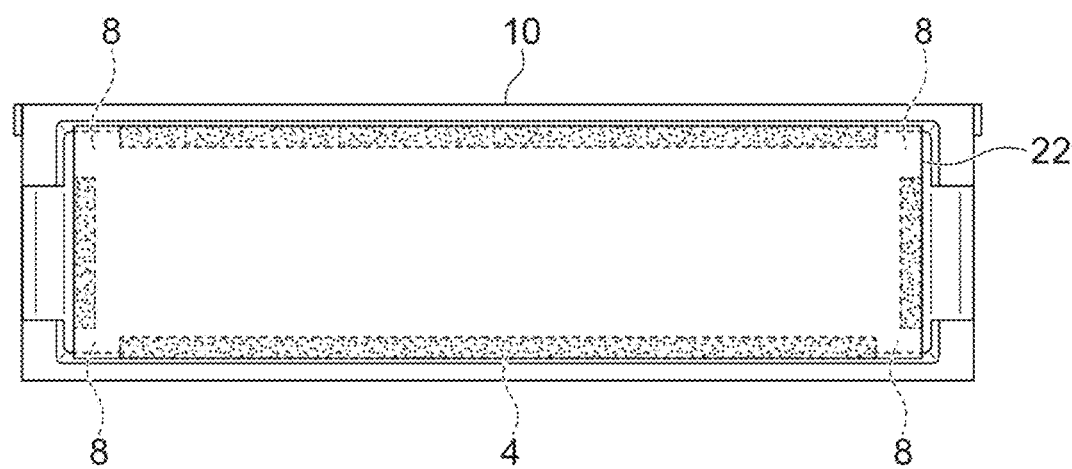

Further, as illustrated in (a) and (b) of FIG. 4, the vent 8 may be provided in the joining member 4 so as to be located at each of both end parts of the second widened part 13b in the longitudinal direction. One vent 8 may be provided at one end part as illustrated in (a) of FIG. 4, or a plurality of (two at corners in this example) vents 8 may be provided at one end part as illustrated in (b) of FIG. 4. Note that in FIG. 4, the wirings 11 are not illustrated in the support 10.

Figure 5:
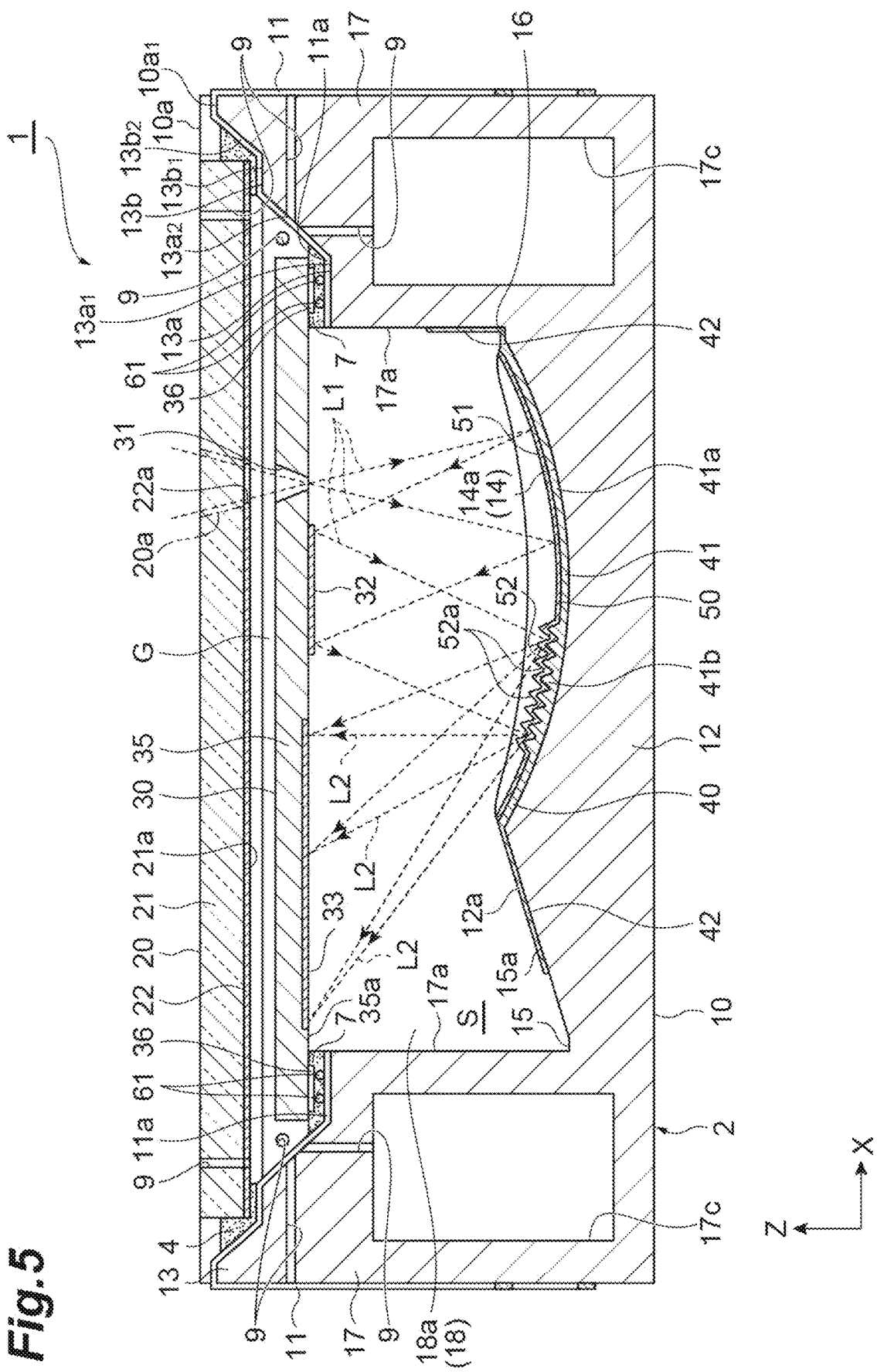
FIG. 5 is a cross-sectional view of a spectrometer including a vent of a modified example.

Further, as illustrated in FIG. 5, a vent 9 that opens to the space G and the outside may be provided in at least one of the cover 20 and the support 10. In the spectrometer 1 illustrated in FIG. 5, in the first widened part 13a having a shape in which the direction (X-axis direction) intersecting with the direction (Z-axis direction) in which light is incident on the spectroscopic space S through the cover 20 is set to the longitudinal direction, the vent 9 is provided on at least one of the cover 20 and the side wall part 13 so as to open to each of both end parts of the first widened part 13a in the longitudinal direction. In particular, a direction in which the vent 9 provided in the side wall part 13 opens intersects with the direction in which the light L1 is incident on the spectroscopic space S through the cover 20. The direction in which the vent 9 opens is a direction passing through a center of an opening of the vent 9 on the space G side and a center of an opening of the vent 9 on the outer side. Note that with regard to any of vents 9, the spectroscopic space S may not be visually observed from the opening on the outer side.

The vent 9 provided in the side wall part 13 may extend along the X-axis direction so as to open to the outside and the end part of the first widened part 13a. Alternatively, the vent 9 provided in the side wall part 13 may extend along the Y-axis direction so as to open to the outside and the end part of the first widened part 13a. Alternatively, the vent 9 provided in the side wall part 13 may extend along the Z-axis direction so as to open to a lightening part 17c and the end part of the first widened part 13a. The lightening part 17c is formed on the first side wall 17 so as to open to the outside. Note that the support 10 may be provided with at least one of these vents 9.

In the spectrometer 1 illustrated in FIG. 5, the spectroscopic space S and the outside communicate with each other by the vent 9 provided in at least one of the cover 20 and the support 10. Therefore, even when the support 10 is heated during mounting of the spectrometer 1, or the temperature of the usage environment of the spectrometer 1 changes, deformation of the support 10 due to a change in internal pressure is suppressed. Therefore, a positional relationship of the mirror 51, the dispersive part 52, the light detection element 30, etc. is less likely to vary. Further, the vent 9 is open to the space G and the outside, and the space G communicates with the spectroscopic space S. In this way, even when stray light is incident on the vent 9 from the outside, the stray light rarely enters the spectroscopic space S. Therefore, the mirror 51 and the dispersive part 52 can appropriately exhibit desired optical functions. Therefore, according to the spectrometer 1 illustrated in FIG. 5, high reliability can be ensured.

Further, in the spectrometer 1 illustrated in FIG. 5, the vent 9 is provided in the support 10 to open to the end part of the first widened part 13a in the longitudinal direction. In this way, since the position of the vent 9 is located away from the optical path in the spectroscopic space S, even when stray light is incident on the vent 9 from the outside, it is possible to more reliably inhibit the stray light from entering the spectroscopic space S.

Further, the spectrometer 1 may adopt at least one of the vent 8 provided in the joining member 4, the vent 9 provided in the cover 20, and the vent 9 provided in the support 10. Each of the vents 8 and 9 is not limited to the above-mentioned position, shape, etc. as long as each of the vents 8 and 9 opens to the defined space G and the outside. Further, the light detection element 30 may be supported by the side wall part 13 so that the spectroscopic space S and the space G communicate with each other. As an example, the light detection element 30 may be supported by the side wall part 13 in a state where a gap is provided between the light detection element 30 and the side wall part 13. Alternatively, a hole, a notch, etc. other than the light passing part 31 may be formed in the substrate 35 of the light detection element 30. Further, for example, when the light detection element 30 is attached to the support member bridged by the side wall part 13, the light detection element 30 may be supported by the side wall part 13 in a state where a gap is provided between the support member and the side wall part 13. Alternatively, a light passing part or a hole, a notch, etc. other than the light passing part may be formed in the support member.

Further, the joining member 4 may structurally (mechanically) join the cover 20 to the support 10. Further, a light shielding member other than the reinforcing member 7 (for example, a light shielding plate provided on the light detection element 3, etc.) may be arranged between each of the vents 8 and 9 and the spectroscopic space S. When the reinforcing member 7 is opaque (for example, black) with respect to light incident on each of the vents 8 and 9, the reinforcing member 7 can function as a light shielding member as in the above embodiment. However, when the reinforcing member 7 is transparent with respect to light incident on each of the vents 8 and 9, it is effective to provide a light shielding member other than the reinforcing member 7.

Further, the mirror 51 may be configured as a mirror element and attached to the surface 12a of the bottom wall part 12. Further, the dispersive part 52 may be configured as a spectroscopic element and attached to the surface 12a of the bottom wall part 12.

Further, each configuration provided in the spectrometer 1 is not limited to the above-mentioned example of the material and shape, and various materials and shapes can be applied. In addition, each configuration in one embodiment or modified example described above can be arbitrarily applied to each configuration in another embodiment or modified example.

REFERENCE SIGNS LIST

1: spectrometer, 4: joining member, 7: reinforcing member (light shielding member), 8, 9: vent, 10: support, 12: bottom wall part, 12a: surface, 13: side wall part, 13a: first widened part, 13b: second widened part (opening part), 20: cover, 20a: light transmitting part, 21: light transmitting member, 22: light shielding layer, 22a: light transmitting opening, 30: light detection element, 51: mirror (optical function part), 52: dispersive part (optical function part), 61: bump (connecting member), G: space, S: spectroscopic space.

The invention claimed is:
1. A spectrometer comprising:
a spectroscopic space defined by a support having a bottom wall part and a side wall part surrounding the spectroscopic space on one side of the bottom wall part, and a light detection element supported by the side wall part to face a surface of the bottom wall part on the one side, the spectroscopic space providing an optical path between the bottom wall part and the light detection element;
a cover arranged on an opening part formed by the side wall part and provided with a light transmitting part;
a joining member arranged between the cover and the opening part;
the light detection element being supported by the side wall part between the spectroscopic space and the cover; and
an optical function part provided on the surface of the bottom wall part on the one side,
wherein a vent is provided in at least one of the support, the cover, and the joining member,
the vent is open to an outside and a space defined by the support, the cover, and the light detection element and ventilates gas between the space and the outside, and the space defined by the support, the cover, and the light detection element communicates with the spectroscopic space.

2. The spectrometer according to claim 1, wherein a direction in which the vent opens intersects with a direction in which light is incident on the spectroscopic space through the cover.

3. The spectrometer according to claim 1, wherein the cover has a light transmitting member and a light shielding layer in which a light transmitting opening is formed.

4. The spectrometer according to claim 1,
wherein the support is provided with a first widened part wider than the spectroscopic space on the one side of the spectroscopic space and a second widened part wider than the first widened part on the one side of the first widened part,
the light detection element is arranged in the first widened part, and
the cover is arranged in the second widened part which is the opening part.

5. The spectrometer according to claim 4,
wherein each of the first widened part and the second widened part has a shape in which a direction intersecting with a direction in which light is incident on the spectroscopic space through the cover is set as a longitudinal direction, and
the vent is provided in the joining member to be located at an end part of the second widened part in the longitudinal direction.

6. The spectrometer according to claim 4,
wherein each of the first widened part and the second widened part has a shape in which a direction intersecting with a direction in which light is incident on the spectroscopic space through the cover is set as a longitudinal direction, and
the vent is provided in the support to open to an end part of the first widened part in the longitudinal direction.

7. The spectrometer according to claim 4,
wherein an end part of a wiring is arranged in the first widened part,
a terminal of the light detection element and the end part of the wiring are electrically connected by a connecting member, and
a reinforcing member is arranged between the light detection element and the first widened part to cover the connecting member.

8. The spectrometer according to claim 1, wherein the optical function part is a dispersive part.

9. The spectrometer according to claim 1, wherein the optical function part is a mirror.

10. The spectrometer according to claim 1, further comprising
a light shielding member arranged between the vent and the spectroscopic space.

* * * * *